United States Patent
Wetchler et al.

(10) Patent No.: US 6,196,663 B1
(45) Date of Patent: *Mar. 6, 2001

(54) METHOD AND APPARATUS FOR BALANCING COLORANT USAGE

(75) Inventors: David M. Wetchler, Vancouver, WA (US); Winthrop D Childers; Michael L Bullock, both of San Diego, CA (US); Jason Quintana, Brush Prairie, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/302,611

(22) Filed: Apr. 30, 1999

(51) Int. Cl.[7] .................................................. B41J 2/21
(52) U.S. Cl. .................................. 347/43; 347/14; 347/40
(58) Field of Search ............................... 347/40, 41, 43, 347/19, 14; 358/1.9

(56) References Cited

U.S. PATENT DOCUMENTS

| | | | |
|---|---|---|---|
| 5,355,159 | * 10/1994 | Kaneko | 349/19 |
| 5,581,284 | * 12/1996 | Hermanson | 347/43 |
| 5,663,750 | 9/1997 | Sakuma | 347/7 |
| 5,812,156 | 9/1998 | Bullock et al. | 347/19 |
| 5,870,077 | 2/1999 | Dillinger et al. | 345/153 |
| 6,030,066 | * 2/2000 | Li et al. | 347/19 |
| 6,062,137 | * 5/2000 | Guo et al. | 347/19 |
| 6,065,824 | * 5/2000 | Bullock et al. | 347/19 |

* cited by examiner

Primary Examiner—N. Le
Assistant Examiner—Lamson D. Nguyen
(74) Attorney, Agent, or Firm—Kevin B. Sullivan

(57) ABSTRACT

One aspect of the present invention is a color printing system that is responsive to color information for forming images on media. The color printing system includes a determining device that determines colorant usage for a plurality of colorants. The determining device detects a balanced condition wherein colorant usage is within a nominal range and an imbalanced condition wherein colorant usage exceeds the nominal range. The color printing system also includes a colorant balancing device. The colorant balancing device responds to the imbalanced condition for altering colorant usage for compensating for the imbalanced condition.

34 Claims, 8 Drawing Sheets

METHOD AND APPARATUS FOR BALANCING COLORANT USAGE

CROSS-REFERENCE TO RELATED APPLICATIONS

This patent application is related to patent application entitled "Method And Apparatus for Operating A Printing Device" filed herewith to Winthrop D. Childers, application Ser. No. 09/302612 assigned to the assignee of the present invention and is incorporated herein by reference.

BACKGROUND OF THE INVENTION

This invention relates to ink-jet printing and, more particularly, to a technique for achieving accurate color printing while balancing use rates of individual colorants.

Color ink-jet printers typically make use of four or more inks to reproduce a specified color. Colors to be printed are often specified in terms of a red, green, and blue (RGB) color description typically used by a computer for displaying color images on a monitor. The inkjet printer, in contrast, forms images which are specified typically in terms of colorants such as cyan, magenta, yellow, and black inks (CMYK). Therefore, the color specification in terms of RGB tone values must be converted into cyan, yellow, magenta, and black ink droplets that when properly deposited on media faithfully reproduces the RGB specified color.

Techniques exist for conversion of the RGB signals into corresponding CMYK inks as well as signals for controlling the printer to eject these inks in the proper manner. The printing system typically makes use of a printhead or drop ejector portion that is frequently mounted within a carriage that is moved back and forth across a print media, such as paper. As the printhead is moved across the print media, a control system activates the printhead to deposit or eject ink droplets onto the print media to form images and text.

The printhead is sometimes mounted to an ink container that supplies ink to the printhead. This ink container is sometimes a multi-chamber ink container that contains more than one ink. These multi-chamber ink containers typically contain one or more of the following inks: black, cyan, yellow, and magenta. Each chamber of the multi-chamber ink container is then fluidically coupled to the drop ejection device or printhead.

One shortcoming of the multi-chamber ink container is that when any of the ink chambers of the multi-chamber ink container is depleted of ink, the entire ink container must be replaced. The ink container must be replaced because the printing system is no longer capable of faithfully reproducing the RGB color descriptions. Discarding the entire multi-chamber ink container prevents the remaining inks in the other chambers from being used, creating waste. This waste is exacerbated if the use rate on any one ink is abnormally high, thereby causing that particular ink to be exhausted well before the other inks. Replacing the entire multi-chamber ink container not only results in discarding unused ink, but in the case where a printhead is mounted to the multi-chamber ink container, discarding the multi-chamber ink container also results in discarding the printhead in which at least portions thereof have not reached end-of-life.

One solution has been to use a black ink chamber that is of greater volume than a volume associated with the other inks. Printers used in typical business applications tend to print more text than graphics, thereby requiring larger volumes of black ink. Where the black ink container is included in a multi-chamber arrangement, this solution reduces waste for those users that require large volumes of black ink. However, for those users who consume black and color inks more evenly, such as in the case of graphics printing, this solution exacerbates the waste problem. For the case where the black and color inks are used more evenly, a greater volume of black ink is unused resulting in the waste of a large amount of black ink.

There is an ever-present need for ink-jet printing systems that have relatively low manufacturing costs that are also economical to operate. These printing systems should be well suited for a wide variety of printing applications such as text and graphics printing. Finally, these printing systems should not require frequent intervention by the consumer such as to replace empty ink containers and should be capable of minimizing ink waste.

SUMMARY OF THE INVENTION

One aspect of the present invention is a color printing system that is responsive to color information for forming images on media. The color printing system includes a determining device that determines colorant usage for a plurality of colorants. The determining device detects a balanced condition wherein colorant usage is within a nominal range and an imbalanced condition wherein colorant usage exceeds the nominal range. The color printing system also includes a colorant balancing device. The colorant balancing device responds to the imbalanced condition for altering colorant usage for compensating for the imbalanced condition.

Another aspect of the present invention is where the color printing system is an ink jet printing system. In this system the color balancing device compensates for the colorant usage imbalance by varying drop volume of at least one colorant.

Yet another aspect of the present invention is where the color balancing device is a color mapping device responsive to color information for specifying colorant values for forming images on media.

DETAILED DESCRIPTION OF THE PREFERRED EMBODIMENT

Figure 1:
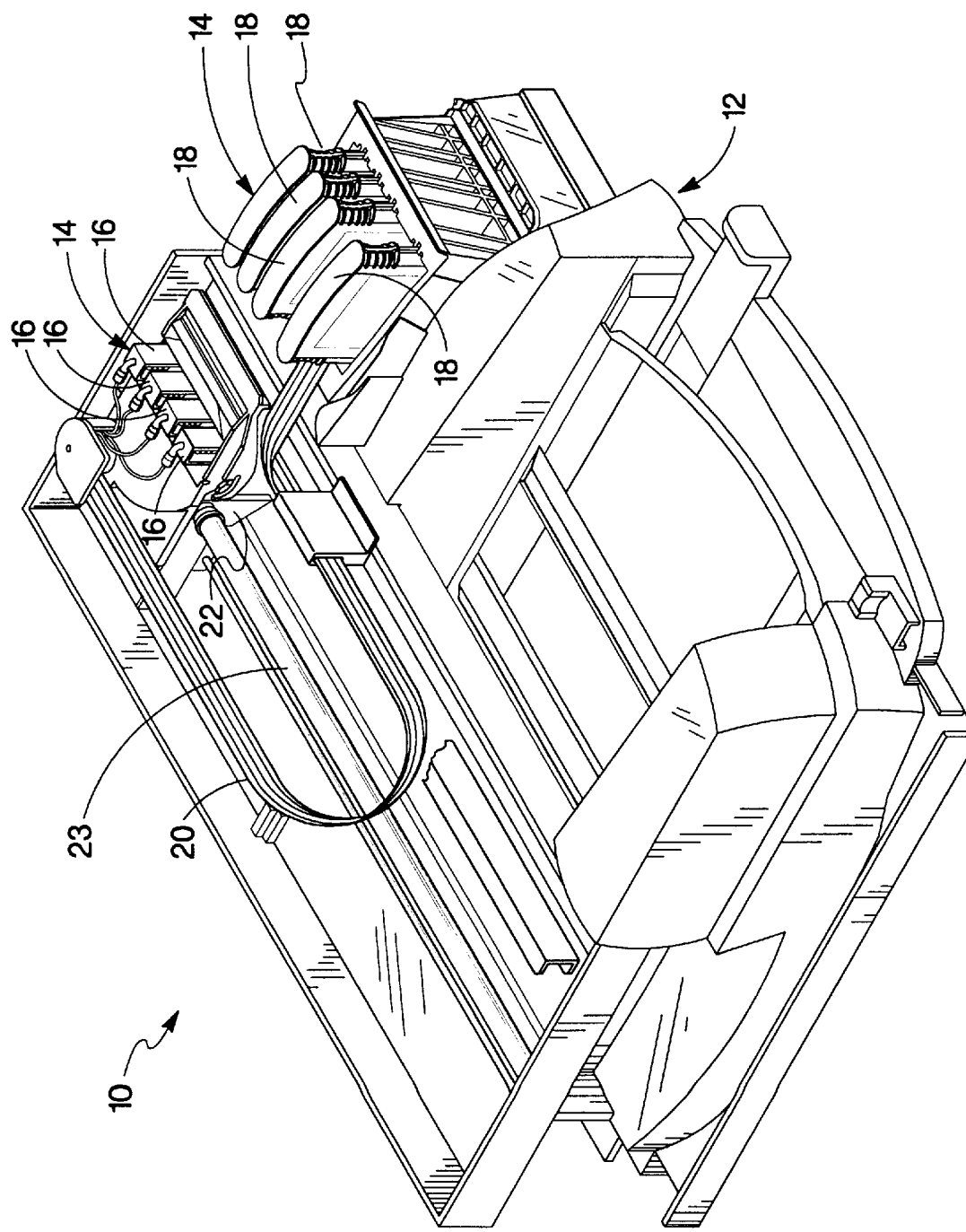
FIG. 1 depicts a perspective view of an exemplary ink-jet printing system, shown with the cover removed, that incorporates the apparatus of the present invention for balancing colorant usage.

FIG. 1 is a perspective view of one exemplary embodiment of an ink-jet printing system 10 of the present invention shown with its cover removed. The ink-jet printing system 10 includes a printer portion 12 having a plurality of replaceable printing components 14 installed therein. The plurality of replaceable printing components 14 includes a plurality of printheads for selectively depositing ink in response to control signals and a plurality of ink containers 18 for providing ink to each of the plurality of printheads 16. Each of the plurality of printheads 16 is fluidically connected to each of the plurality of ink containers 18 by a plurality of flexible conduits 20.

Each of the plurality of printheads 16 is mounted in a scanning carriage 22 that is supported by a carriage support rod 23 for scanning past a print media (not shown). As the plurality of printheads are moved relative to the print media, ink is selectively ejected from a plurality of orifices in each of the plurality of the printheads 16 to form images and text.

An electrical storage device is associated with each of the replaceable printing components 14. The electrical storage device contains information related to the particular replaceable printer component 14. Installation of the replaceable printing component 14 into the printer portion 12 allows information to be transferred between the electrical storage device and the printing portion 12 to insure high print quality as well as to prevent the installation of non-compatible replaceable printing components 14. The information provided from the replaceable printing component 14 to the printing portion 12 tends to prevent operation of the printing system 10 in a manner which damages the printing system 10 or which reduces the print quality.

Although the printing system 10 shown in FIG. 1 makes use of ink containers 18 which are mounted off of the scanning carriage 22, the present invention is equally well-suited for other types of printing system configurations. One such configuration is one where the replaceable ink containers 18 are mounted on the scanning carriage 22. Alternatively, the printhead 16 and the ink container 18 may be incorporated into an integrated printing cartridge that is mounted to the scanning carriage 22. Finally, the printing system 10 may be used in a wide variety of applications such as facsimile machines, postal franking machines, copiers, and large format type printing systems suitable for use in displays and outdoor signage.

Figures 2A, 2B:
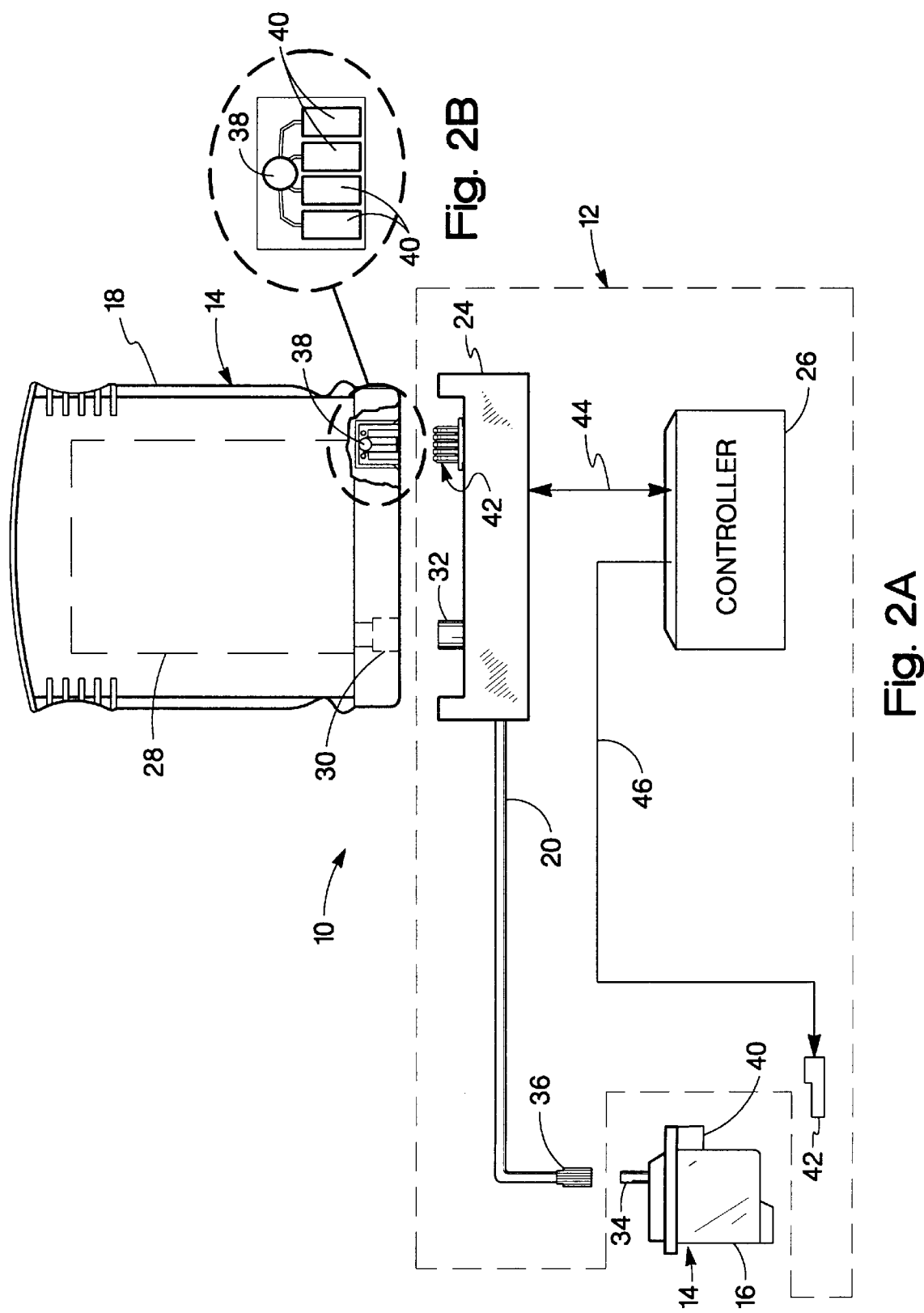
FIGS. 2A and 2B depicts a schematic representation of the ink-jet printing system shown in FIG. 1 illustrating a removable ink container, printhead and controller of the present invention.

FIGS. 2A and 2B depict a simplified schematic representation of the ink-jet printing system 10 of the present invention shown in FIG. 1. FIGS. 2A and 2B are simplified to illustrate a single printhead 16 and a single ink container 18 for accomplishing the printing of a single color. For the case where more than one color is desired, a plurality of printheads 16 are typically used with each printhead 16 having an associated ink container 18 as shown in FIG. 1.

The ink-jet printing system 10 of the present invention includes a printer portion 12 having replaceable printing components 14. The replaceable printing components 14 include a printhead 16 and an ink container 18. The printer portion 12 includes an ink container receiving station 24 and a controller 26. With the ink container 18 properly inserted into the ink container receiving station 24, an electrical coupling and a fluidic coupling are established between the ink container 18 and the printer portion 12. The fluidic coupling allows ink stored within the ink container 18 to be provided to the printhead 16. The electrical coupling allows information to be passed between the ink container 18 and the printer portion 12 to ensure that the operation of the printer portion 12 is compatible with the ink contained in the ink container 18, thereby achieving high print quality and reliable operation of the printing system 10.

The controller 26 controls the transfer of information between the printer portion 12 and the ink container 18. In addition, the controller 26 controls the transfer of information between the printhead 16 and the controller 26. Finally, the controller 26 controls the relative movement of the printhead 16 and the print media as well as selectively activating the printhead to deposit ink on print media.

The ink container 18 includes a reservoir 28 for storing ink therein. A fluid outlet 30 is provided that it is in fluid communication with the fluid reservoir 28. The fluid outlet 30 is configured for connection to a complimentary fluid inlet 32 associated with the ink container receiving station 24.

The printhead 16 includes a fluid inlet 34 configured for connection to a complimentary fluid outlet 36 associated with the printing portion 12. With the printhead 16 properly inserted into the scanning carriage 22 (shown in FIG. 1), fluid communication is established between the printhead and the ink container 18 by way of the flexible fluid conduit 20.

The ink container 18 includes an information storage device 38 such as an electrical storage device or memory 38 for storing information related to the ink container 18. A plurality of electrical contacts 40 are provided, each electrical contact being electrically connected to the electrical storage device 38. With the ink container 18 properly inserted into the ink container receiving station 24, each of the plurality of electrical contacts 40 engage a corresponding plurality of electrical contacts 42 associated with the ink container receiving station 24. Each of the plurality of electrical contacts 42 associated with the ink container receiving station 24 are electrically connected to the controller 26 by a plurality of electrical conductors 44. With proper insertion of the ink container 18 into the ink container receiving station 24, the memory 38 associated with the ink container 18 is electrically connected to the controller 26 allowing information to be transferred between the ink container 18 and the printer portion 12.

The controller 26 selectively activates the printhead 16 to eject or deposit ink on print media. With the printhead 16 properly inserted into the scanning carriage 22, each of the plurality of electrical contacts 40 engages a corresponding plurality of electrical contacts 42 associated with the printing device 12. Once properly inserted into the scanning carriage, the electrical storage device 38 associated with the printhead 16 is electrically connected to the controller 26 by way of a plurality of electrical conductors 46.

Figure 3:
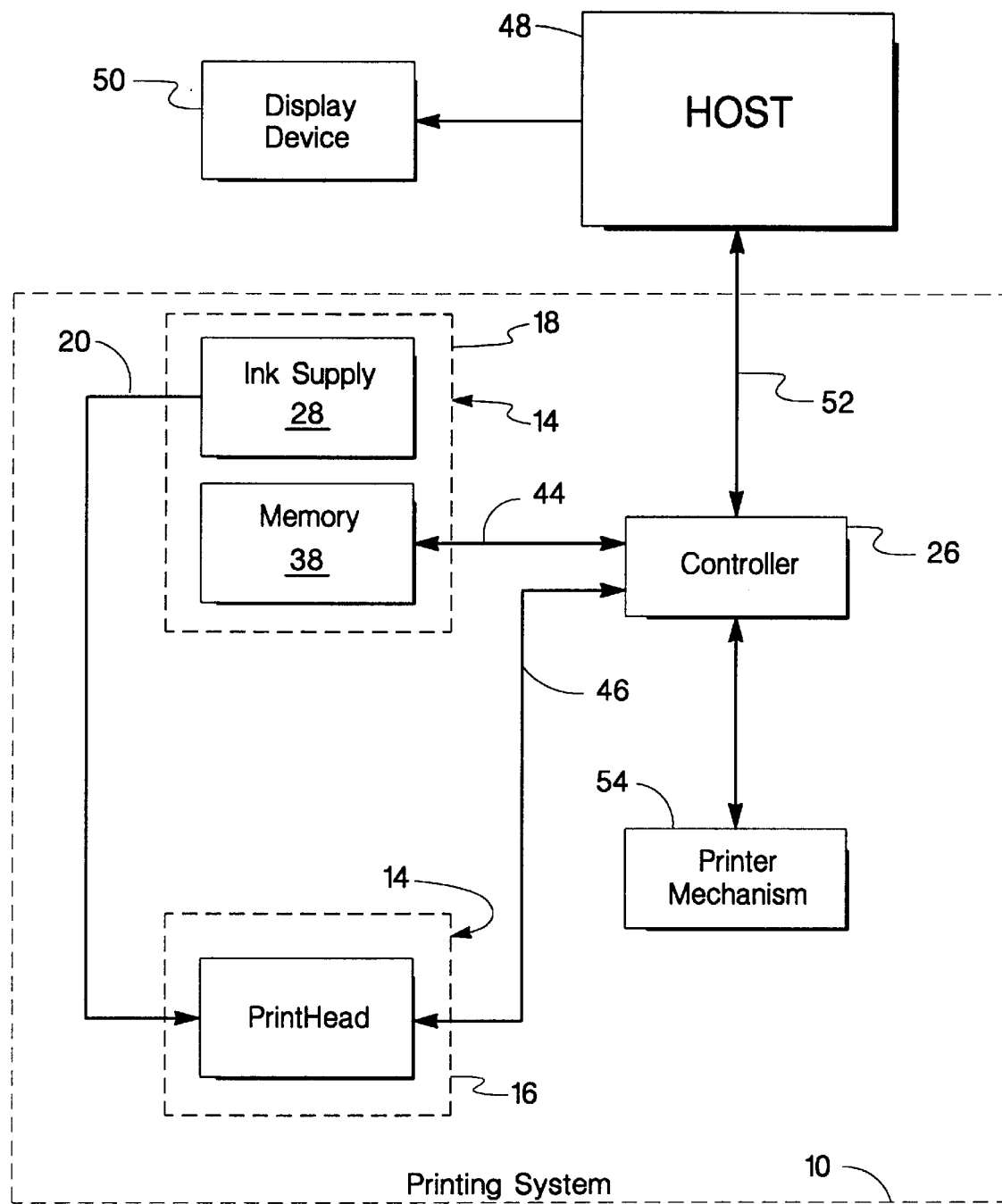
FIG. 3 depicts a schematic block diagram of the ink-jet printing system of FIG. 1 shown connected to a host and which includes a removable ink container, printhead and controller of the present invention.

FIG. 3 represents a block diagram of the printing system 10 of the present invention shown connected to an information source or host computer 48. The host computer 48 is shown connected to a display device 50. The host 48 can be a variety of information sources such as a personal computer, work station, or server to name a few, that provides image information to the controller 26 by way of a data link 52. The data link 52 may be any one of a variety of conventional data links such as an electrical link or an infrared link for transferring information between the host 48 and the printing system 10.

The controller 26 is electrically linked to the electrical storage device 38 associated with the ink container 18. In addition, the controller 26 is electrically linked to a printer mechanism 54 for controlling media transport and movement of the carriage 22. This link may be a variety of different linkages such as electrical or optical linkage that supports information transfer. The controller 26 makes use of parameters and information provided by the host 48, the memory 38 associated with the ink container 18 to accomplish printing.

Among the parameters, for example, which can be stored in the electrical storage device 38 associated with the ink container 18 are the following: actual count of ink drops emitted from the printhead 16, a date code associated with the ink container 18, date code of initial insertion of the ink container 18, system coefficients, ink type/color, ink container size, age of the ink, printer model number or identification number, cartridge usage information, just to name a few.

In one embodiment, the memory 38 provides information to the controller 26 that is indicative of an amount of ink remaining in ink container 18. For the case where the ink container 18 is a multi-chamber ink supply containing a plurality of different inks, the memory 38 provides information indicative of the amount of ink remaining in each of the chambers. In one embodiment the memory is segmented into separate addressable data fields with each data field corresponding to each of the plurality of different ink chambers of the multi-chamber ink supply.

The host computer 48 provides image description information to the printing system 10 for forming images on print media. The image description typically includes color information that specifies a particular color associated with an image portion. The color description can be a conventional color description such as a red, green and blue (RGB) or some other color description the printing system 10 is capable of interpreting. In addition, the host computer 48 provides various parameters for controlling operation of the printing system 10, which is typically resident in printer control software typically referred to as the "print driver".

Figure 4A:
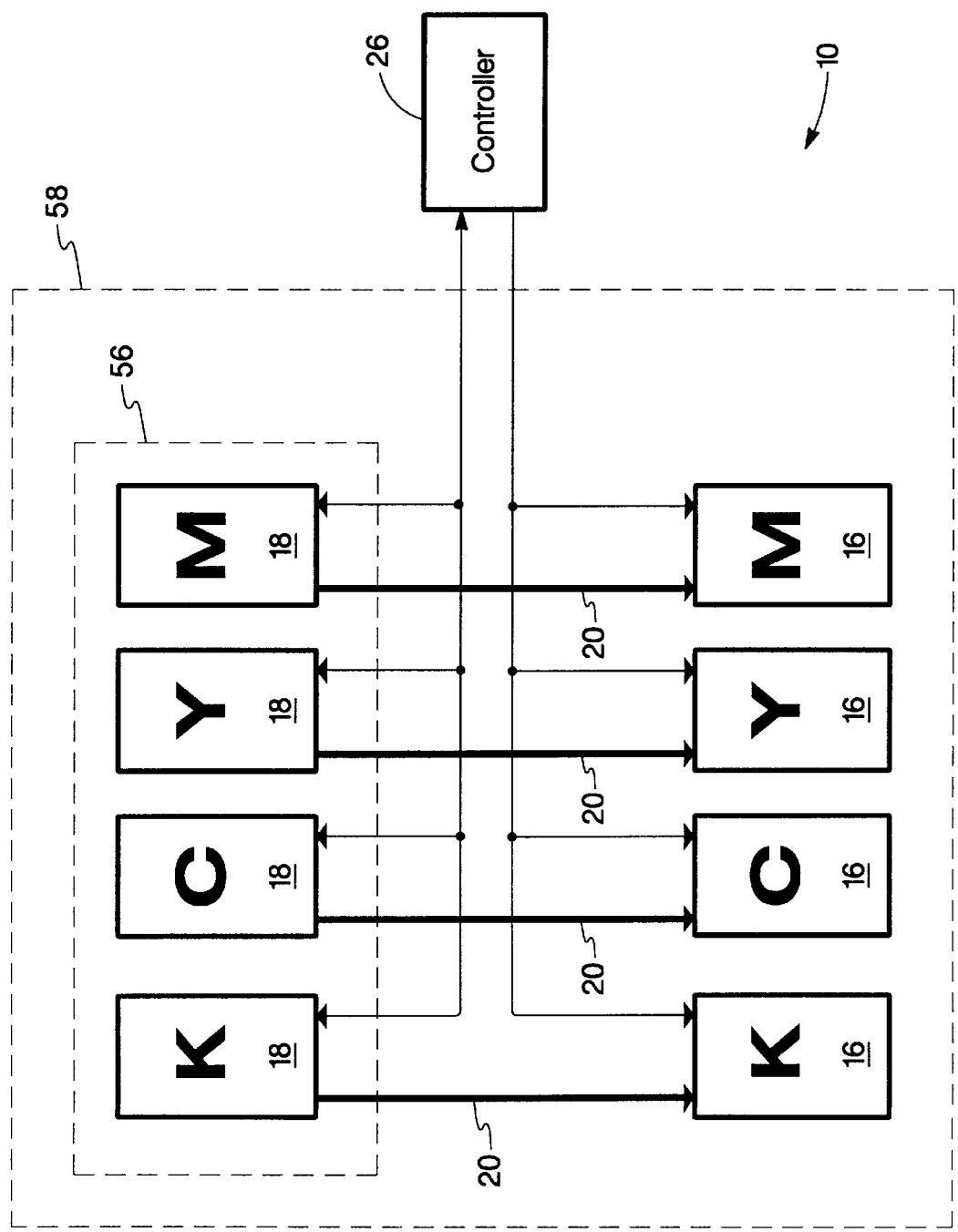
FIGS. 4A and 4B depict schematic representations of two exemplary embodiments of the ink container, printhead and controller of the ink-jet printing system shown in FIG. 1.

FIG. 4A depicts a simplified schematic representation of the printing system 10 of the present invention. The printing system 10 includes a plurality of ink containers 18 and a plurality of printheads 16. Each of the plurality of ink containers 18 is fluidically coupled to a corresponding printhead 16 by a fluid conduit 20. Each of the plurality of ink containers 18 and each of the plurality of printheads 16 are associated with a corresponding ink color, black (K), cyan(C), yellow(Y) and magenta(M).

While the printing system 10 makes use of four separately replaceable printheads 16 and four separately replaceable ink containers 18 that are mounted off the scanning carriage, there are other configurations which are also contemplated. For example, each of the ink containers 18 may be combined together as one integral replaceable printing component 14 as represented by Box 56, shown in dashed lines. In this configuration, a single replaceable ink container 18 is inserted into the printing system 10 to provide ink for each of the plurality of printheads 16. This single replaceable ink container 56 includes a plurality of compartments, each compartment containing a quantity of ink. In the case of a four-color printer, the ink container 56 has four compartments with each compartment containing one of the corresponding ink colors such as black, cyan, yellow, and magenta. This combined ink container 56 is either mounted off the scanning carriage as shown in the embodiment in FIG. 1 or is mounted on the scanning carriage to move with the printhead 16.

In one embodiment a single memory device 38 is included with the ink container 56 for providing information to controller 26 indicative of the volume of ink remaining for each of the colorants. The memory 38 includes four data fields with each data field corresponding to each colorant. For example, one of the data fields is used to maintain information relating to black ink remaining in ink container 56.

Yet another configuration for the ink containers 18 and printheads 16, by way of example, is where more than one ink container and more than one printhead are integrated into a single replaceable ink cartridge as represented by box 58 shown in dashed lines. This replaceable ink cartridge 58 shown in FIG. 4A has four ink containment portions, one for each of the four ink colors, and one or more printheads 16 attached to this ink cartridge 58 for depositing each of the four ink colors onto print media. When any one of the four colorants is exhausted of ink, the entire ink cartridge 58 must be replaced.

Similarly, in the case of separately replaceable ink containers where the ink containers are integrated together to form one replaceable ink container 56 and any one ink color is exhausted, the entire ink container 56, which includes all four colors, must be replaced. Finally, in the case where separate ink containers 18 are used such as shown in FIG. 1, when a single ink container 18 is exhausted of ink, only that particular ink container 18 needs to be replaced. However, the intervention frequency required to replace the ink containers 18 is increased because the ink containers 18 will in general not exhaust their ink supply at the same time. Therefore, intervention is required as each ink container 18 is exhausted.

Figure 4B:
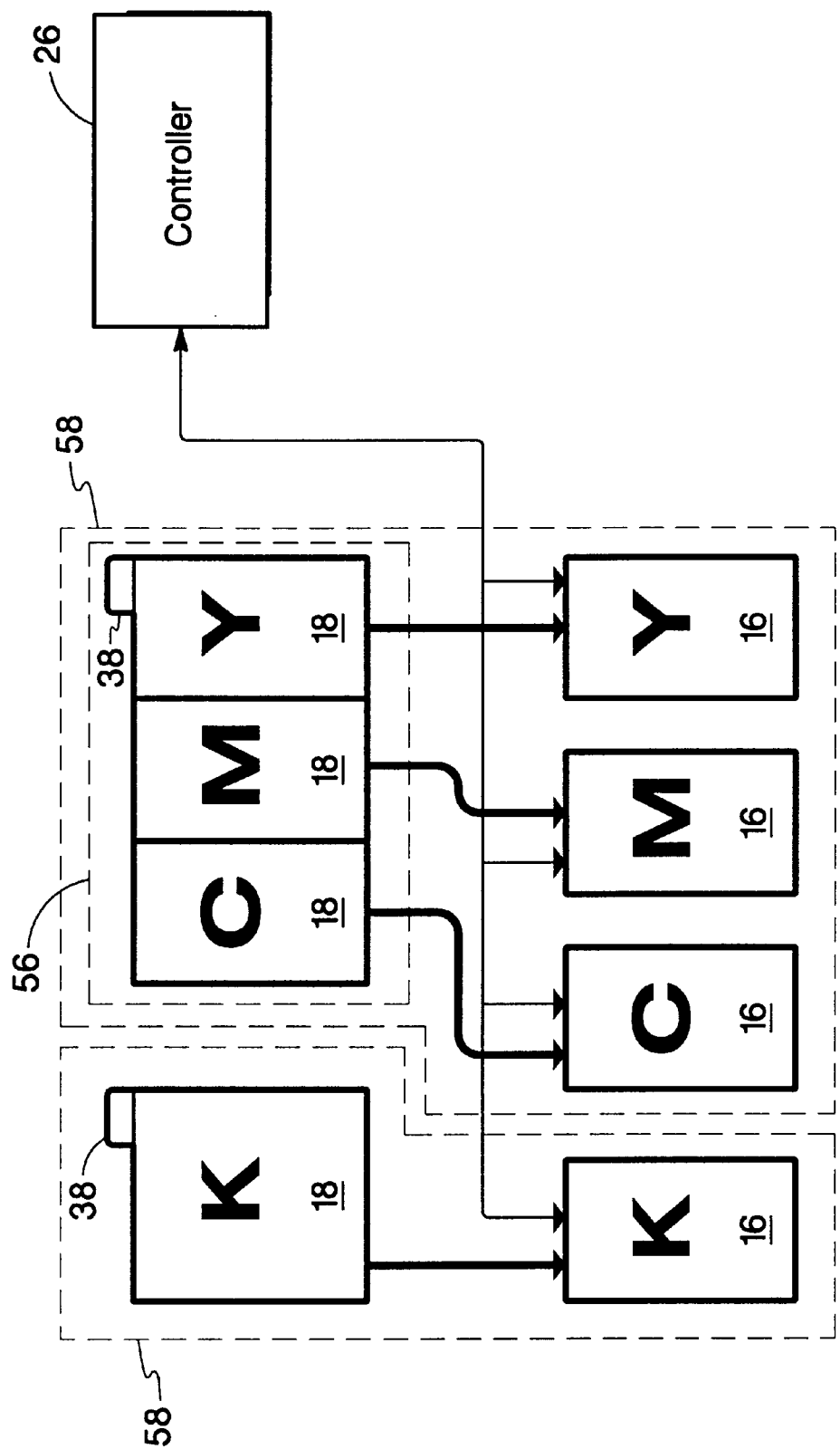

FIG. 4B depicts yet another embodiment having two separate replaceable printing components represented by boxes 58, shown in dashed lines. One of the replaceable printing components is the black ink container 18 labeled with a K. A second replaceable printing component is a multi-chamber ink container 56 represented by box 56, shown in dashed lines and is labeled with a CMY, one letter per chamber or ink container 18. The color ink containers 18 are replaced as one unit. The black ink container 18 is replaceable separately from the color ink containers 18. The black ink cartridge provides ink to printhead 16 labeled K. The color cartridge provides ink to each color printhead 16 labeled C, M, and Y. Preferably in such an embodiment, the black ink container 18 would have a memory device 38 for providing information to controller 26 indicative of the amount of ink remaining in the black ink container 18. Similarly, the color ink container 56 includes a memory device 38 providing information to controller 26 indicative of the amount of ink of each color remaining in color ink container 18 labeled C, M, and Y.

The multi-chamber ink container represented by box 56 can be expanded to contain more than three colors. One such example is a five chamber color cartridge 56 containing cyan, magenta, yellow, light cyan, and light magenta for a printing system that provides for very high quality images. In such a system, the levels of each of the five colors would preferably be tracked using a single memory device 38. Further expansion to more than five colorants is also contemplated.

The ink containers 18 shown in FIG. 4B can be replaceable separately from the printhead 16 or integrated with the printhead 16 as shown by boxes 56. In the case where the printhead 16 and ink container are integrated into single replaceable unit, this unit may be one color as illustrated for the black cartridge or more than one color as illustrated by the multi-chamber cartridge. Examples of such black and color cartridges include the black cartridge model number HP 51645A and the tri-color model number HP C 1823A, manufactured by Hewlett Packard Company of Palo Alto, Calif.

One aspect of the present invention is a method and apparatus for balancing colorant usage to minimize ink waste as well as to reduce intervention frequency. The technique of the present invention involves monitoring ink usage to determine an imbalanced ink usage condition. Upon the occurrence of an imbalanced ink usage condition, the controller 26 adjusts the operation of the printing system 10 to compensate for this imbalanced condition.

The imbalanced condition is a condition where ink usage deviates sufficiently from a predetermined or nominal use rate designed to accommodate a majority of applications. For nominal use rate applications, once this nominal use rate is determined, the individual ink containers 18 or ink compartments can then be sized in accordance with this nominal use rate. For example, the nominal user will tend to use more black colorant than either cyan, yellow, or magenta colorants. Therefore, the black colorant ink container 18 is initially sized larger so that for the nominal user the black ink supply will be exhausted at approximately the same time as the cyan, yellow, and magenta ink supplies. However, it is where ink usage deviates from this nominal use rate the balancing technique of the present invention is used to prevent waste.

As shown in FIG. 4A and 4B, the controller 26 in the exemplary embodiment receives ink usage information from the ink containers 18. In one embodiment, this usage information is determined by the use of an ink level sensor which is placed either in or adjacent to the ink containers 18. The ink level sensor provides information related to the remaining ink in the ink containers 18 from which the controller 26 can determine whether an imbalanced condition has occurred.

Alternatively, the controller 26 can make use of a pixel counting technique to determine either use rate for each of the ink containers 18. This technique involves keeping track of the number of pixels generated using each colorant. By counting the number of pixels generated for each colorant, the controller 26 can determine either remaining ink in the ink containers or a use rate for the various colorants. The controller 26 can then adjust the colorant usage if the use rate deviates from a standard or nominal use rate. This nominal use rate can be a use rate for the standard user or can be a use rate for the particular user. In the case where the nominal use rate is for the particular user, a history of colorant use is maintained to determine a nominal use rate for this user.

Instead of adjusting colorant usage rate after an imbalance occurs, the controller can predict that imbalances will occur and adjust colorant usage prior to an imbalance condition. This method of prediction requires that the remaining ink be known and a colorant use rate is inferred. As discussed previously, the remaining ink can be determined from ink level sense information or pixel generation counting. The use rate can be inferred based on a standard colorant use rate store in the controller 26 or from a history colorant use for the particular user. The controller 26 can predict which colorant will be exhausted first and adjust colorant usage accordingly.

An imbalanced condition occurs when the ink usage deviates beyond a threshold amount from the nominal ink usage rate. In the case where the initial sizing of the ink containers 18 corresponds to the nominal usage profile, then the ink usage as a percentage of the ink container volume can be compared for each container. An imbalanced condition is of greatest interest where the percentage of ink consumed is greater in one or more ink containers than the remaining ink containers. If the percentage of ink used in any one container is greater than the others, then it is likely that this container will be exhausted before the others.

Figure 5:
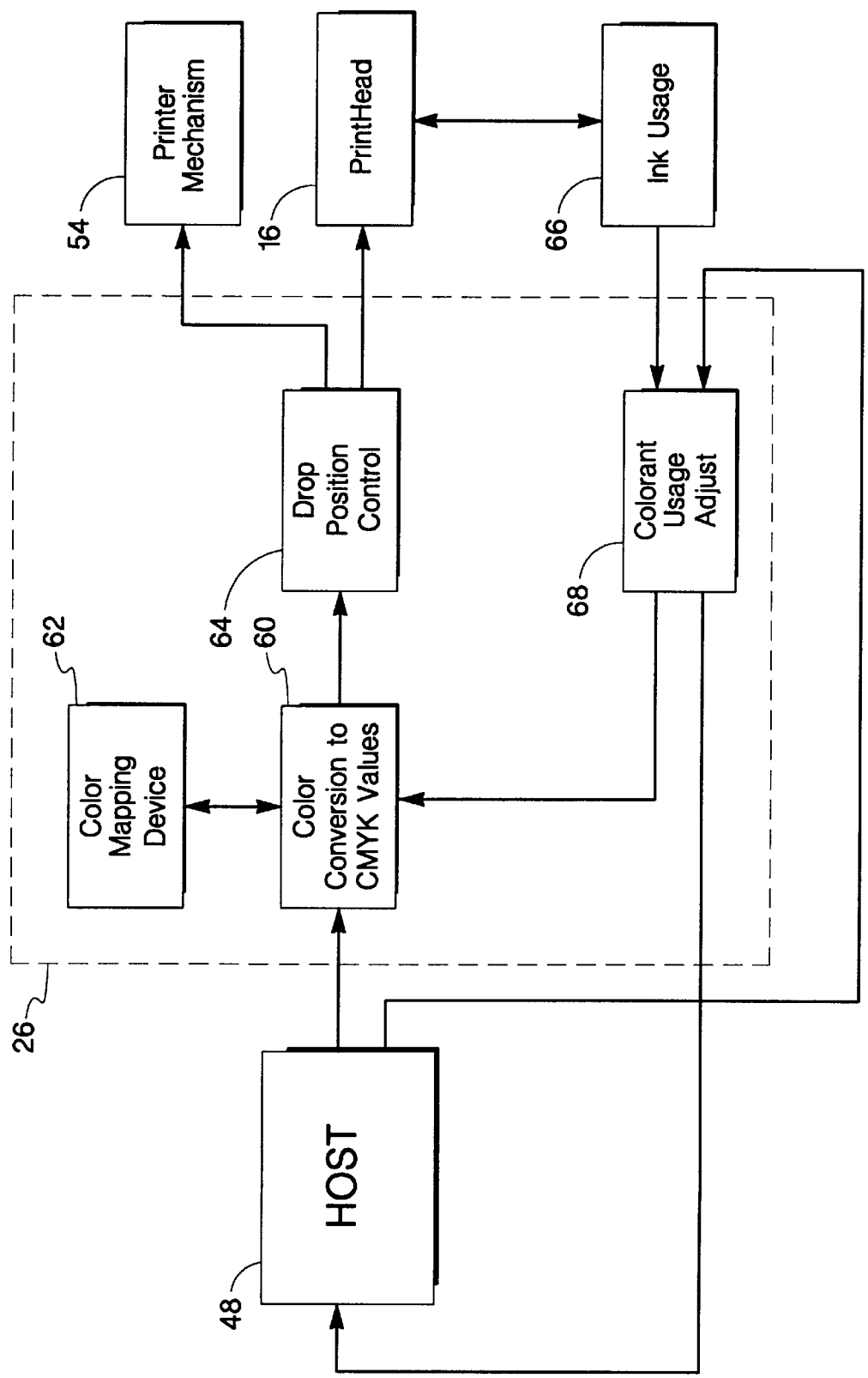
FIG. 5 depicts a schematic representation of the printer controller of the present invention.

FIG. 5 depicts greater detail of the controller 26 for the printing system 10 of the present invention. As discussed previously, the controller 26 is responsive to image information provided by the host 48 for providing control signals for selectively activating the printhead 16 to eject drops while controlling the printer mechanism 54 to position the printhead 16 over selective portions of the print media. The image information provided by the host 48 includes a color specification for an image portion. This color specification, if not in terms of the colorants available to the printing system 10, must be converted by the color conversion device 60 and color mapping device 62. In the case where the color specification provided by the host 48 is in terms of red, green and blue (RGB) values, these values must be converted to cyan, magenta, yellow, and black values. In one embodiment, this color conversion is accomplished using a three-dimensional color space mapping. Color space mapping makes it is possible to simulate colors in the visible spectrum using the subtractive primary colors of yellow, magenta, and cyan for each additive RGB color value. One or more sets of CMYK values can be selected from the color space to identically match the RGB color value. In addition, other colorant set values which provide a close approximation to the RGB color value can also be identified. These colorant value sets that are a close approximation to the RGB color value are not exact and therefore typically result in a slight hue shift.

Alternatively, the color mapping device 62 can be implemented using a look-up table to accomplish color space conversion. The look-up table includes CMYK values for various RGB values. For improved resolution an interpolation technique can be used to interpolate between entries in the look-up table.

Once the CMYK color value is determined, the precise drop position or positions is determined by the device 64. The drop position control device 64 converts the CMYK values to half-tone values corresponding to the number of drops of CMYK ink for each printer pixel position. Half-toning is typically used because color ink-jet printers provided with three colorants of ink and black cannot print pixel colors having 256 levels of intensity as provided by the RGB values. Use of half-toning allows the overall color tone in an area on the print medium to closely match the color specified by the RGB value. A typical half-toning technique that is commonly used is error diffusion.

Once the number of drops of each of the CMY and K colorants are determined for each printer pixel position, this information is provided to control each of the printheads 16 and the printer mechanism 54 to accomplish the printing of CMYK ink drops corresponding to half-tone values.

An important aspect of the present invention is the balancing of colorant usage so that the ink within the ink containers 18 will be exhausted at approximately the same time. The balancing of colorant usage is accomplished by monitoring colorant usage or colorant remaining in each of the ink containers 18 as represented by the ink usage determining device. As discussed previously, ink usage can be determined in a variety of ways such as monitoring ink usage by drop counting or the use of ink level sensors to monitor ink level in the containers 18. Based on ink usage information, the colorant usage adjust device 68 determines whether a color imbalance has occurred and whether this colorant imbalance exceeds a threshold amount. If the colorant imbalance exceeds a threshold amount, an adjustment is made to the color conversion process represented by devices 60 and 62 to conserve the colorant or colorants which are overused. Colorant is conserved using a variety of techniques.

One technique for conserving a particular ink is in the case where there are several sets of colorant values which approximate the RGB value in the color mapping device. The particular set of values that are selected are based on selecting the set of CMYK values that minimize the use of the particular colorant to be conserved. In the case where a look-up table is used to convert RGB values to CYMK values, three or four look-up tables can be used, each of which is configured to conserve a particular colorant. When the particular colorant which is to be conserved is identified by the colorant usage device 68, then the particular look-up table that conserves this colorant is selected. Alternatively, a single lookup table can be used, and the lookup table is modified to compensate for a desired colorant use rate adjustment. For example, the look-up table can be modified to conserve a particular color or modified to use more of one or more colors.

If adjustments are made frequently enough, colorant usage will tend to be equal to or nearly equal to the predetermined nominal usage profile. The colorant use rate adjustments should be very small adjustments so that these adjustments do not result in noticeable hue shifts. In one embodiment these adjustments correct a use rate imbalance over a range of 50 to 300 color pages printed. In addition, the colorant use rate adjustment should not be made during the printing of a page. Adjustments on the same page can result in a noticeable hue shift on that page. Ink usage that approximates the nominal ink usage rate results in each of the ink containers 18 exhausting its supply of ink at approximately the same time. As discussed previously, exhausting the ink supply at the same time reduces waste and minimizes user intervention.

Another technique for colorant usage balancing involves the balancing of black, magenta, and cyan colorants. This technique makes use of selectively using cyan and magenta colorants in black regions such as within text characters. Cyan and magenta inks increase the optical density, and if used sparingly such as less than 30 percent, any hue shift is unnoticeable. Using this technique, black ink is conserved at the expense of cyan and magenta inks. Alternatively, magenta or cyan ink can be mixed with black to increase the use rate of either of these inks. Larger amounts of cyan and magenta can be mixed with black colorants if a noticeable hue shift is tolerable.

Figure 6:
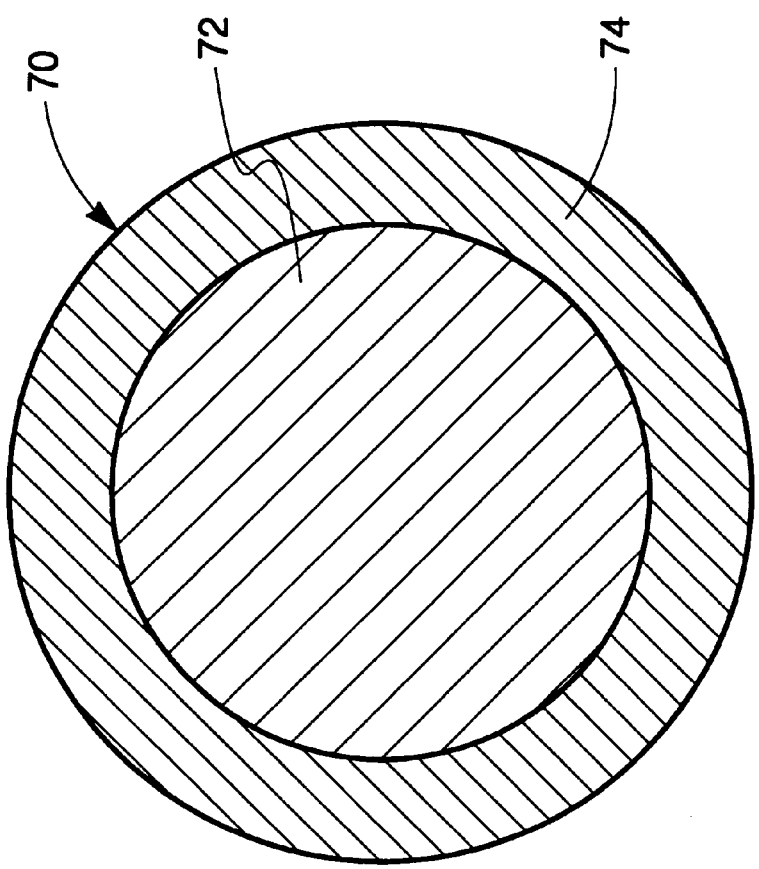
FIG. 6 depicts one technique of the present invention for reducing usage of black ink by the use of both black ink and a composite black ink.

Yet another example of colorant adjustment to balance color and conserve black ink. In the case where the use of black ink exceeds use of the primary colorants cyan, yellow, and magenta, a composite black formed by combining cyan, yellow, and magenta can be substituted for the black colorant. This technique tends to conserve black ink. A variation of this technique is illustrated in FIG. 6. FIG. 6 represents a text character 70 such as a period. The text character 70 is formed by printing a composite black in the inner region of the text character 72 and a true black along an outer edge 74 of the text character. This technique allows the text characters to have high edge acuity while requiring less black colorant.

A notification can be made to the user to identify that an imbalance of colorant usage has occurred. This message can be displayed on an output device either associated with the printing system 10 or on a display associated with the host 48. The colorant balancing can then be overridden for best print quality. Alternatively, notification can be provided to notify only in the event that the colorant balancing will result in a noticeable hue shift or change in print quality. The override signal can come from the host 48 or some other input device such as an override switch on the print system 10.

Figure 7:
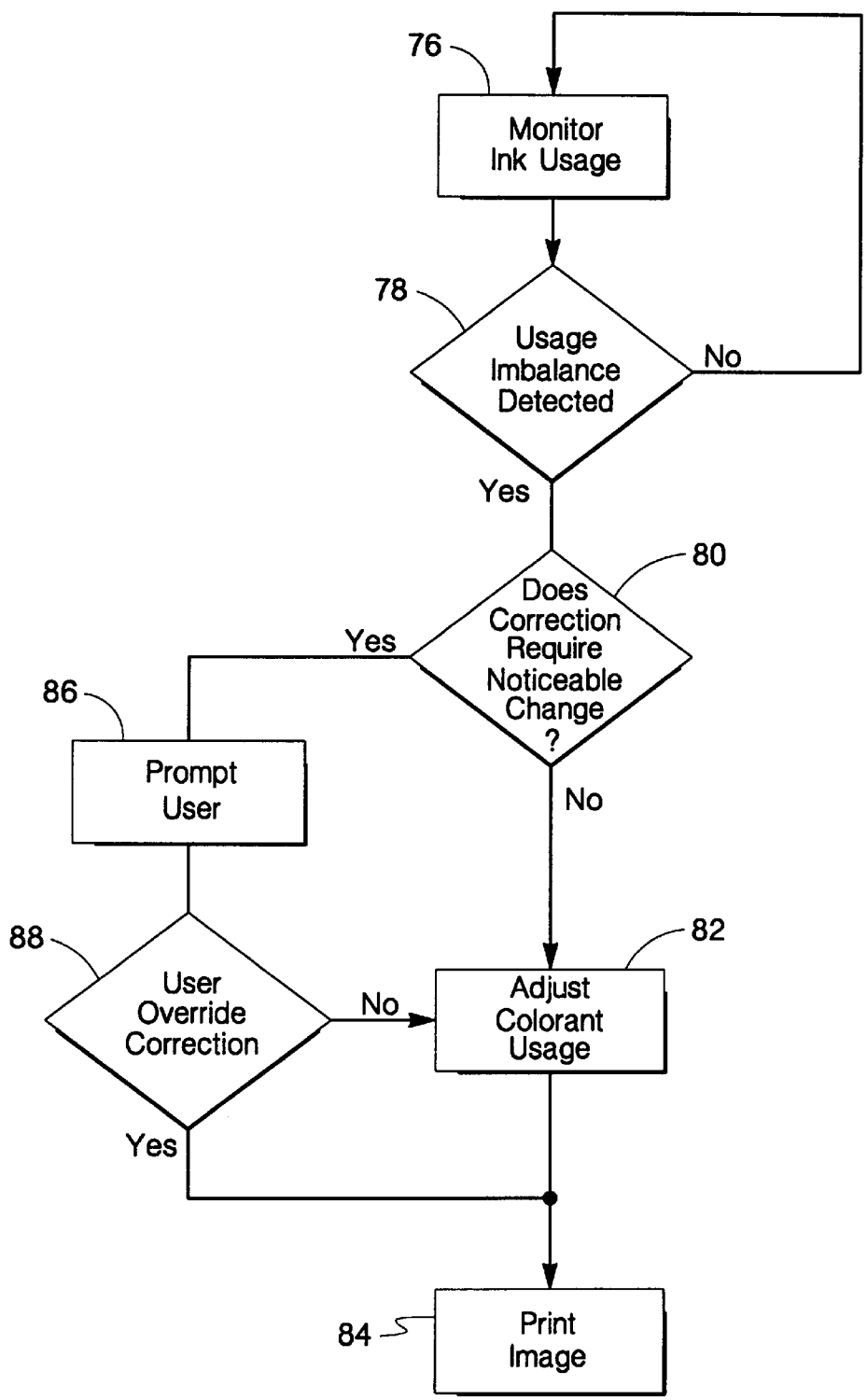
FIG. 7 depicts a schematic representation of one aspect of the method of the present invention for balancing ink usage.

In operation, one aspect of the present invention can be represented by the method depicted in FIG. 7. The colorant usage is monitored for each colorant as represented by step 78, and a determination is made whether this imbalance is beyond a threshold amount. If this imbalance is beyond a threshold amount, a determination is made whether this imbalance will require a noticeable change in the output image as represented by step 80. If the change does not produce a noticeable change, the colorant usage is adjusted as represented by step 82, and the image is printed as represented by step 84.

In the event that a noticeable change is required to compensate for the usage imbalance detected in step 78, then the user is prompted that a reduction in print quality will occur. The user can then decide whether a reduction in print quality is tolerable. If intolerable, then the colorant adjustment can be overridden as represented by step 88, and the image is printed as represented by step 84. In the event that the user decides a reduction in print quality is acceptable, then the colorant usage is adjusted as represented by step 82, and the image is printed as represented by step 84.

The technique of the present invention balances colorant usage to minimize ink waste as well as reduce the intervention frequency required to replace ink containers. The technique of the present invention allows the balancing of colorant usage without a reduction in print quality. Most of the balancing techniques do not require a noticeable change in print quality. Other compensation techniques do require noticeable changes in print quality such as hue shifts. However, a user override can be used to ensure maximum print quality if so desired.

The technique of the present invention has been described herein as being implemented using hardware devices such as custom integrated circuits or some form of programmable logic. Alternatively, the present invention can be implemented in software that runs on a microprocessor, a programmable controller, the host computer or some similar functioning device.

What is claimed is:

1. A color ink jet printing system responsive to color information for forming images on media, the color printing system comprising:
    a determining device for determining colorant usage for a plurality of colorants, the determining device detecting a balanced condition wherein colorant usage is within a nominal range and an imbalanced condition wherein colorant usage exceeds the nominal range; and
    a colorant balancing device responsive to the imbalanced condition for altering colorant usage for compensating for the imbalanced condition by reducing usage of a high use rate colorant.

2. The color printing system of claim 1 wherein the color balancing device compensates for the colorant usage imbalance over a plurality of pages printed.

3. The color printing system of claim 1 wherein the color balancing device compensates for the colorant usage imbalance over more than 50 pages printed.

4. The color printing system of claim 1 wherein the color printing system is an ink jet printing system and wherein the color balancing device compensates for the colorant usage imbalance by reducing usage of a high use rate colorant.

5. The color printing system of claim 1 wherein the color balancing device is a color mapping device responsive to color information for specifying colorant values for forming images on media.

6. The color printing system of claim 1 wherein the determining device determines color usage based on a nominal colorant usage rate and predicts an imbalance condition based on remaining colorant.

7. An ink-jet printing system responsive to color information for forming images on media, the ink-jet printing system comprising:
- a sensing device for determining colorant usage for a plurality of colorants relative to a predetermined colorant use schedule, the sensing device detecting a balanced condition wherein colorant usage is within a nominal range and an imbalanced condition wherein colorant usage exceeds the nominal range; and
- a color mapping device responsive to color information for specifying colorant values for forming images on media, the color mapping device specifying a first set of colorants for the balanced condition and a second set of colorants, different from the first set of colorants, for the imbalanced condition.

8. The ink-jet printing system of claim 7 wherein the sensing device is a device for monitoring colorant usage over a specified monitoring period.

9. The ink-jet printing system of claim 7 wherein the sensing device is a colorant level sensing device for determining remaining colorant for each of the plurality of colorants.

10. The ink-jet printing system of claim 7 wherein the color mapping device specifies an amount of each of cyan, yellow, magenta and black colorants in response to color description information.

11. The ink-jet printing system of claim 7 wherein the color mapping device in response to color information provides a set of colorants from a look up table.

12. The ink-jet printing system of claim 7 wherein the color mapping device specifies a third set of colorants for the imbalanced condition and wherein upon an imbalanced condition determined by the sensing device the color mapping device selects a set of colorants from the second and third set of colorants to reduce imbalance in colorant usage.

13. The ink-jet printing system of claim 7 wherein the first set of colorants more closely approximates the color information than the second set of colorants.

14. The ink-jet printing system of claim 7 further including an input device for specifying the first set of colorants for the imbalanced condition.

15. An ink-jet printing system having a plurality of colorants for forming images on print media, the ink-jet printing system comprising:
- a monitoring device for determining a colorant usage for the plurality of colorants; and
- a mapping device having a plurality of color maps with each of the plurality of color maps for mapping colors into the plurality of colorants, each of the plurality of color maps selected to use individual colorants at different rates, the mapping device responsive to the colorant usage provided by the monitoring device for selecting a color map from the plurality of color maps for specifying colorants for approximately balancing colorant usage of the plurality of colorants.

16. The ink-jet printing system of claim 15 wherein the monitoring device is a device for monitoring colorant usage over a specified monitoring period.

17. The ink-jet printing system of claim 15 wherein the monitoring device is a colorant level sensing device for determining remaining colorant for each of the plurality of colorants.

18. The ink-jet printing system of claim 15 wherein the monitoring device determines colorant usage for the plurality of colorants relative to a predetermined colorant use schedule.

19. The ink-jet printing system of claim 15 wherein the mapping device specifies an amount of each of cyan, yellow, magenta and black colorants in response to color description information.

20. The ink-jet printing system of claim 15 wherein the color mapping device specifies a third set of colorants for the imbalanced condition and wherein upon an imbalanced condition determined by the sensing device the color mapping device selects a set of colorants from the second and third set of colorants to reduce imbalance in colorant usage.

21. The ink-jet printing system of claim 15 further including an input device for specifying a particular color map that represents a most accurate representation of the color information from the plurality of color maps.

22. The ink-jet printing system of claim 15 wherein the mapping device is a look-up table.

23. A method of operating a printing device having a plurality of colorants, the method comprising:
- comparing usage of colorant of the plurality of colorants with a usage profile, including determining a percentage of colorant remaining in each corresponding colorant container;
- selecting colorants for printing a selected color to compensate for colorant usage deviations from the usage profile; and
- depositing the selected colorants on media.

24. The method of operating a printing device of claim 23 wherein comparing usage of each colorant is comparing use rates of each colorant to a predetermined usage profile.

25. An ink supply device for a multi-color ink jet printer, the ink jet printer including control electronics that control colors to be generated on a media:
- a plurality of compartments each containing a different color of ink, the plurality of compartments for providing ink to a corresponding plurality of printhead ejector portions, each portion using a different one of the plurality of different colors; and
- an electronic device that receives updating signals from the controller that are indicative of an amount of ink used to generate the colors on the media and stores volume information that is indicative of the amount of each of the plurality of ink colors remaining in each of the plurality of compartments.

26. The ink supply device of claim 25, wherein the electronic device has a plurality of separate data fields, each data field corresponding to a particular color from the 10 plurality of different colors, each data field storing information indicative of the deliverable volume remaining of the particular color.

27. The ink supply device of claim 25, wherein the printing system uses the volume information to determine a color mapping to extend the usable life of the ink supply device.

28. The ink supply device of claim 25, further comprising a printhead that is integral to the ink supply device.

29. The ink supply device of claim 25, wherein the ink supply device is separable from the printhead ejector portions.

30. A color ink jet printing system responsive to color information for forming images on media, the color printing system comprising:
- a determining device for determining colorant usage for a plurality of colorants, the determining device detecting a balanced condition wherein colorant usage is within a nominal range and an imbalanced condition wherein colorant usage exceeds the nominal range; and a colorant balancing device responsive to the imbalanced condition for altering colorant usage for compensating for the imbalanced condition by increasing usage of a low use rate colorant.

31. A color printing system responsive to color information for forming images on media, the color printing system comprising:

a determining device for determining colorant usage for a plurality of colorants, the determining device detecting a balanced condition wherein colorant usage is within a nominal range and an imbalanced condition wherein colorant usage exceeds the nominal range, said determining device determining color usage based on a nominal colorant usage rate and predicts an imbalance condition based on remaining colorant; and a colorant balancing device responsive to the imbalanced condition for altering colorant usage for compensating for the imbalanced condition.

32. An ink-jet printing system responsive to color information for forming images on media, the ink-jet printing system comprising:

a sensing device for determining colorant usage for a plurality of colorants, the sensing device detecting a balanced condition wherein colorant usage is within a nominal range and an imbalanced condition wherein colorant usage exceeds the nominal range, the sensing device a colorant usage sensing device for determining remaining colorant for each of the plurality of colorants; and a color mapping device responsive to color information for specifying colorant values for forming images on media, the color mapping device specifying a first set of colorants for the balanced condition and a second set of colorants, different from the first set of colorants, for the imbalanced condition.

33. An ink-jet printing system responsive to color information for forming images on media, the ink-jet printing system comprising:

a sensing device for determining colorant usage for a plurality of colorants, the sensing device detecting a balanced condition wherein colorant usage is within a nominal range and an imbalanced condition wherein colorant usage exceeds the nominal range; and a color mapping device responsive to color information for specifying colorant values for forming images on media, the color mapping device specifying a first set of colorants for the balanced condition and a second set of colorants, different from the first set of colorants, for the imbalanced condition.

34. A method of operating a printing device having a plurality of colorants, the method comprising:

comparing usage of colorant of the plurality of colorants with a usage profile;

selecting colorants for printing a selected color to compensate for colorant usage deviations from the usage profile; and depositing the selected colorants on media.

* * * * *